United States Patent
Nessi et al.

(10) Patent No.: US 6,249,099 B1
(45) Date of Patent: Jun. 19, 2001

(54) SILENT PHASE COMMUTATION IN A THREE-PHASE BRUSHLESS DC MOTOR

(75) Inventors: Maurizio Nessi, Como; Ezio Galbiati, Agnadello; Pierandrea Savo, Pavia; Giorgio Sciacca, Genoa; Luca Schillaci, Pavia, all of (IT)

(73) Assignee: STMicroelectronics, S.r.l., Agrate Brianza (IT)

( * ) Notice: Subject to any disclaimer, the term of this patent is extended or adjusted under 35 U.S.C. 154(b) by 0 days.

(21) Appl. No.: 09/345,694

(22) Filed: Jun. 30, 1999

(51) Int. Cl.$^7$ .................................................. H02P 7/50
(52) U.S. Cl. ............................................ 318/439; 318/138
(58) Field of Search .................................... 318/138, 439, 318/254, 432, 798

(56) References Cited

U.S. PATENT DOCUMENTS

| | | | |
|---|---|---|---|
| 4,651,067 | * 3/1987 | Ito et al. | 318/254 |
| 5,097,191 | * 3/1992 | Bahn | 318/701 |
| 5,191,269 | * 3/1993 | Carobolante | 318/254 |
| 5,204,594 | * 4/1993 | Carobolante | 318/254 |
| 5,304,902 | * 4/1994 | Ueki | 318/254 |
| 5,569,989 | * 10/1996 | Acquaviva | 318/254 |
| 5,614,797 | * 3/1997 | Carobolante | 318/432 |
| 5,869,946 | * 2/1999 | Carobolante | 318/811 |
| 6,049,181 | * 4/2000 | Kalomeitsev | 318/254 |

\* cited by examiner

Primary Examiner—Robert E. Nappi
Assistant Examiner—Rina I. Duda
(74) Attorney, Agent, or Firm—Theodore E. Galanthay; Robert Iannucci; Seed IP Law Group, PLL

(57) ABSTRACT

A method drives a three-phase motor having first, second, and third coils. The method electrically connects the first coil to a first voltage reference and the second coil to a second voltage reference while leaving the other coil floating during a first driving phase. During a second driving phase, the first coil is electrically connected to the first voltage reference and the third coil is electrically connected to the second voltage reference while the second coil is left floating. During a transition phase that immediately follows the fast driving phase and immediately precedes the second driving phase, the second coil is electrically connected alternately to the first and second voltage references. By alternately connecting the second coil to the first second voltage references and during the transition phase, the method causes the current through the second coil to reduce to zero at a slower rate than prior methods. This enables the variations of the currents that the two phases in commutation, the second and third coils, to happen in a way that maintains their sum constant, as much as possible. This reduces the torque ripple during the phase commutations and its accompanying acoustic noise.

19 Claims, 3 Drawing Sheets

SILENT PHASE COMMUTATION IN A THREE-PHASE BRUSHLESS DC MOTOR

TECHNICAL FIELD

The present invention relates to DC motors, and more particularly, to reducing the noise generated during phase commutation of a three phase, current controlled motor.

BACKGROUND OF THE INVENTION

Three-phase brushless DC motors have many uses, among which are as spindle motors for computer hard disk drivers, digital video disk (DVD) drivers, CD players, and tape-drives for video recorders. Such motors are recognized as having the highest torque and power capability for a given size and weight Compared to DC motors employing brushes, brushless DC motors enjoy reduced noise generation and improved reliability because no brushes need to be replaced due to wear.

FIG. 1 shows such a three-phase brushless DC motor 10 with three phases A, B, C having three coils 12, 14, 16 connected to each other in a Y-configuration at a center tap 18. As is well-known, the coils 12, 14, 16 are part of a stator that causes a permanent magnet rotor to rotate. The first coil 12 (phase A) is connected to a supply voltage Vret by a first high-side transistor 20 and to ground via a first low-side transistor 22 and a sense resistor 23; the second coil 14 (phase B) is connected to the supply voltage Vret by a second high-side transistor 24 and to ground via a second low-side ransistor 26 and the sense resistor; and the third coil 16 (phase C) is connected to the supply voltage Vret by a third high-side transistor 28 and to ground by a third low-side transistor 30 and the sense resistor 23. Each of the transistors is an NMOS transistor as is typical. Represented in FIG. 1 by voltage supply symbols are respective back EMF sources EA, EB, EC that are inherently induced by the permanent magnets of the rotor while the rotor is rotated.

This type of motor is driven by exciting its phases in a suitable sequence while always keeping two phases under power and leaving a third phase in tristate or floating with a high impedance (Z). For example, assume that initially the fist high-side transistor 20 and the second low-side transistor 26 are activated with high control signals on their gates while the other transistors are inactive. This results in a current IA through the first phase A having a value of +I, a current IB through the second phase having a value of –I, and zero current IC through the third phase as shown in FIG. 2. At predetermined instances (t1, t2, . . . ) the driving of the phase switches so that current is driven through the phase that was previously floatin and one of the other phases is left floating such that the algebraic sum of the currents in the three phases are always equal to zero. In FIG. 2 the driving sequence is as follows where the first letter indicates the phase of positive current flow and the second letter indicates the phase of negative current flow:

AB-AC-BC-BA-CA-CB.

In the instant of commutation from one stage to another (instances t1, t2, . . . ), if the current front were infinite, one would ideally find a system without perturbations. For example, at the instant t1, the phase A would maintain the current +I while the phases B and C would exchange the current flow, one from –I to 0 and the other from 0 to –I.

In reality, because of the presence of different time constants in the circuit, the commutation fronts of the two currents (IB and IC in the example of instant t1) would be non-ideal and non-synchronous. That is, the current IC increases more slowly than the current IB decreases. This translates into a variation of the current IA instead of the current IA remaining constant. The current variation generates torque ripple in the motor and much acoustic noise.

Analyzing the scheme of FIG. 1, it is possible to determine the reasons for the different commutation times in the two interested phases. At instant t1 (before the commutation) we would have:

VoutA=Vret IA=I

VoutB=0 IB=–I

VoutC=Vct IC=0

Vct=½ Vret

Given that the phases are out of phase by 120°, the electromotive forces driven will be instantaneously algebraically summed to zero. The commutation moreover happens at the instant t1 at the end of optimizing the torque ripple in the system. The back EMF in the three phases would have the following values: EA=E, EB=EC=–E/2, where E equals the maximum back EMF.

In the instant just after the commutation we would have:

VoutA=Vret

VoutB=Vret+Vbe (due to the current of coil B recirculating in the intrinsic diode of second high-side transistor 24, where Vbe equals the drop across that intrinsic diode)

VoutC=0

Vct=⅔ Vret.

The back EMF values will remain instantaneously unchanged.

The voltage across the second coil 14 is therefore:

VoutB–(Vct+EB)=Vret+Vbe–(⅔Vret–E/2)=⅓Vret+Vbe+E/2, while the voltage across the third coil 16 is:

VoutC–(Vct+EC=0–(⅔Vret–E/2)=E/2–⅔Vret.

The two voltages will therefore be significantly different, creating different time constants of charge/discharge of the two currents (IB will be reduced more quickly than C will be increased).

SUMMARY OF THE INVENTION

An embodiment of the invention is directed to a method and motor driver for driving a three-phase motor having first, second, and third coils. The method electrically connects the first coil to a first voltage reference and the second coil to a second voltage reference while leaving the other coil floating during a fist driving phase. During a second driving phase, the first coil is electrically connected to the first voltage reference and the third coil is electrically connected to the second voltage reference while the second coil is left floating. During a transition phase that immediately follows the first driving phase and immediately precedes the second driving phase, the second coil is electrically connected alternately to the first and second voltage references. By alternately connecting the second coil to the first and second voltage references and during the transition phase, the method causes the current through the second coil to reduce to zero at a slower rate than prior art methods. This enables the variations of the currents what the two phases in commutation, the second and third coils, to happen in a way that maintains their sum substantially constant. This reduces the torque ripple occurring during phase commutations and its accompanying acoustic noise.

DETAILED DESCRIPTION

Figure 1:
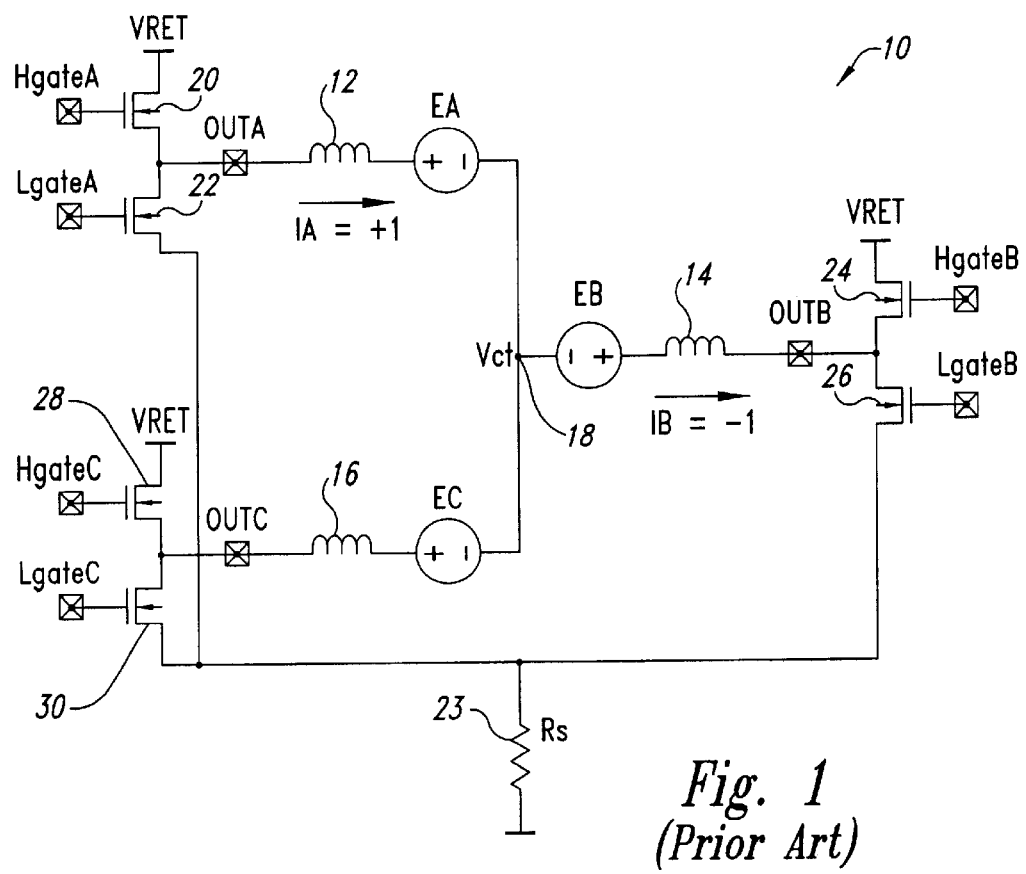
FIG. 1 is a circuit diagram of a three-phase brushless motor according to the prior art.
Figure 2:
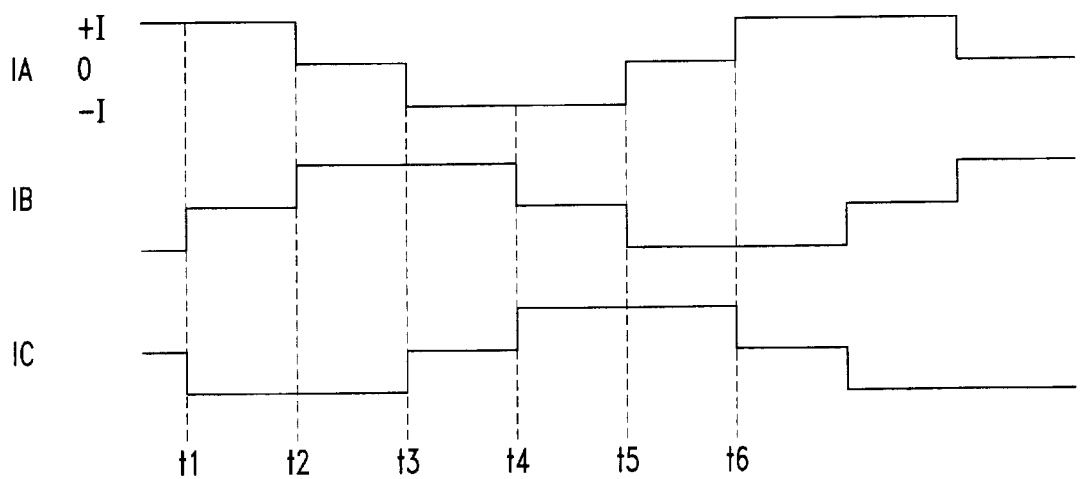
FIG. 2 is a timing diagram of the currents through the respective phases of is the motor shown in FIG. 1.
Figure 3:
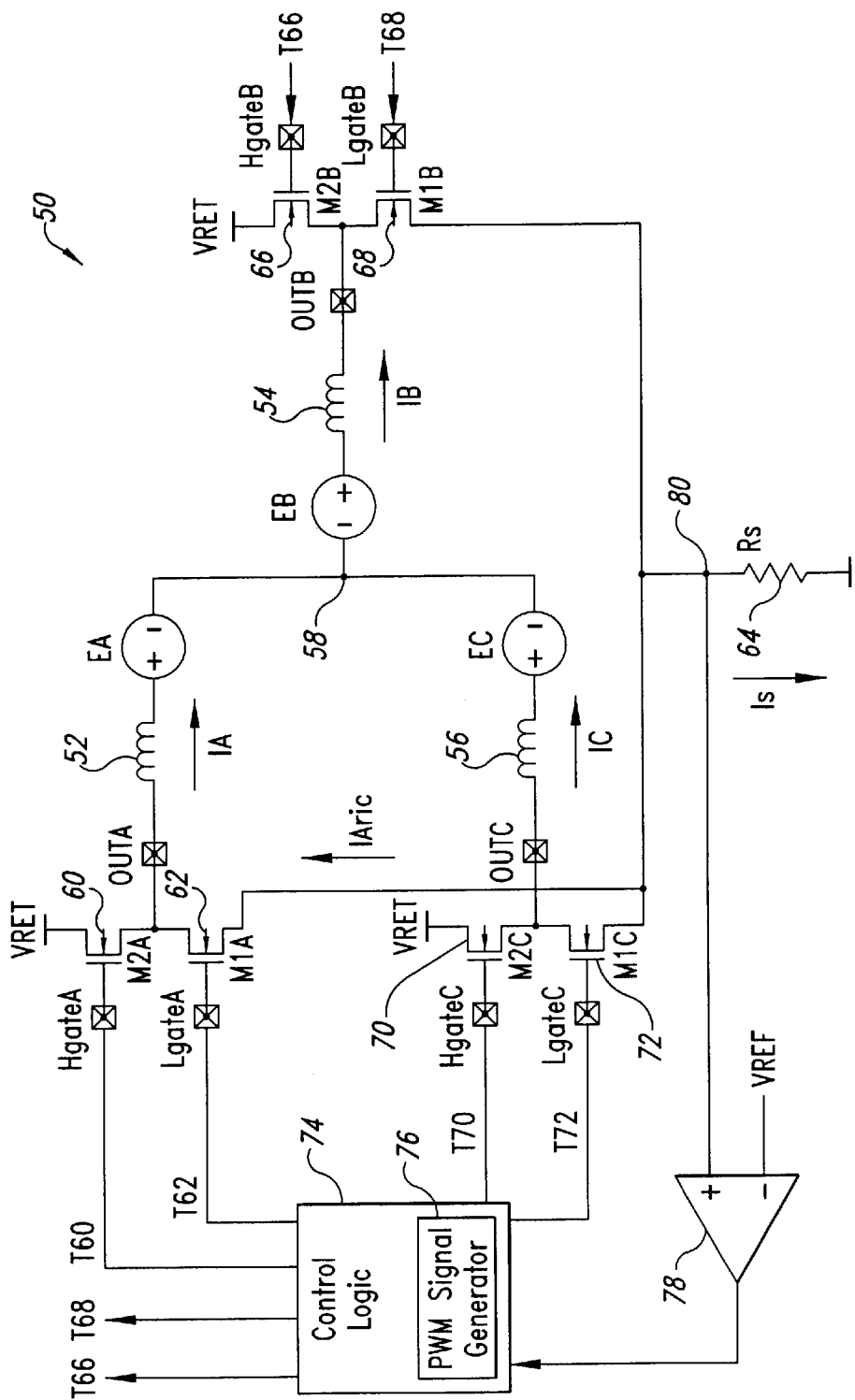
FIG. 3 is a circuit diagram of a three-phase brushless motor according to an embodiment of the present intention.

A three-phase brushless motor 50 according to be present invention is shown in FIG. 3. The motor 50 includes three coils 52, 54, 56 connected to each other in a Y-configuration at a center tap 58. The first coil 52 is connected to a supply voltage Vret by a first high-side transistor 60 and to the ground via a first low-side transistor 62 and a sense resistor 64; the second coil 54 is connected to the supply voltage Vret by a second high-side transistor 66 and to ground via a second low-side transistor 68 and the sense resistor 64; and the third coil 56 is connected to the supply voltage Vret by a third high-side transistor 70 and to ground by a third low-side transistor 72 and the sense resistor 64. Each of the transistors 60–62, 66–68, 70–72 is typically an NMOS transistor. Represented in FIG. 3 by voltage supply symbols are respective back EMF sources EA, EB, EC that are inherently introduced by the permanent magnets of the rotor while the rotor is rotated.

The motor 50 also includes control logic 74 coupled to the gates of the control transistors 60–62, 66–68, 70–72 in order to control the activation and deactivation of those transistors. In this matter, the control logic 74 controls which of the coils 52–56 are supplied with current and in which direction the current flows through those coils. The control logic 74 includes a pulse width modulation (PWM) signal generator 76 that generates PWM control signals as described in more detail below. The control logic is coupled to an output of a comparator 78 having an inverting input coupled to a voltage reference (Vref) and a non-inverting terminal coupled to a node 80 between the sense resistor 64 and each of the low-side transistors 62, 68, 72.

Figure 4:
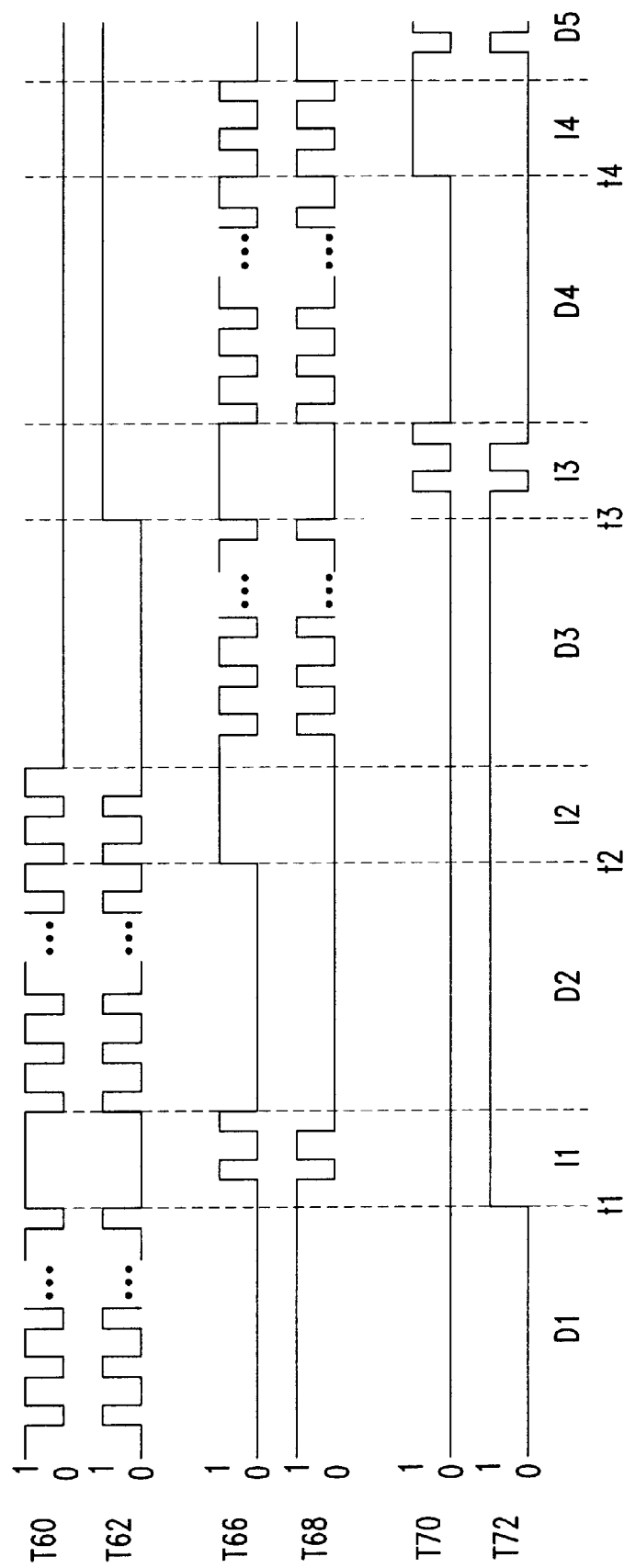
FIG. 4 is a timing diagram of the control signals applied to the gates of the control transistors of the motor shown in FIG. 3.

Shown in FIG. 4 is a schematic timing diagram of the control signals applied to the gates of the control transistors 60–62, 66–68, 70–72 by the control logic 74 of FIG. 3. During successive driving phases, we will have one phase driven in PWM, one phase short-circuited toward ground (through the sense resistor 64), and the third phase remains in tristate. In a first driving phase D1, the first coil 52 is driven in PWM, the second coil 54 is coupled to ground, and the third coil 56 is in tristate. Coil 52 drive is accomplished by driving the gate of the first high-side transistor 60 with a first PWM control signal, driving the gate of the first low-side transistor 62 with a second PWM control signal (an inversion of the first PWM control signal). Coil 54 drive is obtained driving the second low-side transistor 68 with a constant high signal. Remaining transistors 66,70,72 are driven by applying logic low control signals. The current IA through the first coil 52 will be I, the current IB through the second coil 54 will be −I and the current IC through the third coil 56 will be zero. The comparator 78 enables the control logic 74 to control the current through the coils by adjusting the first and second PWM control signals as needed based on the current Is through the sense resistor 64 as detected by the comparator.

If we want to effectuate a phase change between the phases B and C (coils 54, 56), at the end of the phase chance we should have IB=0 and IC=−I. At an instant t1, beginning a first transition phase I1 from the first driving phase D1 to a second driving phase D2, the control logic 74 drives phase A (coil 52) with a duty cycle equal to 100%, drives phase B (coil 54) with a PWM which is an inverted version of the one used in driving phase D1 on phase A, and couples phase C (coil 56) to ground. Specifically, during the first transition phase I1 the control logic 74 applies a constant high control signal to the gate of the first high-side transistor 60; a constant low signal to the gate of the first low-side transistor 62; the second and first PWM control signals to the second high- and low-side transistors 66, 68, respectively; a constant low control signal to the third high-side transistor 70 and a constant high control signal to the third low-side transistor 72.

By applying the PWM control signals to the second high- and low-side transistors 66, 68, the absolute value of the current IB through the second coil 54 will tend to decrease while the second high-side transistor 66 is turned ON by the second PWM control signal and will tend to increase when the second low-side transistor 68 is turned ON by the first PWM control signal. The time of total discharge of the second coil 54 will be therefore longer than it would be if the same coil 54 had been immediately put in tristate as in the traditional systems. It will be appreciated that the application of the first and second PWM control signals could be reversed during the first transition phase I1, although with a less effective reduction of the discharge rate of the second coil 54.

The current IC through the third coil 56 will grow with two different time constants according to whether the second high-side transistor 66 or the second low-side transistor 68 are turned ON by its respective PWM control signal during the first transition phase I1. When the second high-side transistor 66 is turned ON, the voltage at the center tap 58 is higher than when the low-side transistor 68 is turned ON. As a result, the time constant of the current IC through the third coil 56 is higher when the second high-side transistor 66 is turned ON and lower when the second low-side transistor 68 is turned ON. Overall what happens is a slowing of the discharge of the second coil 54 which will be forced to adapt itself to the time constant of the third coil 56.

The current IA through the first coil 52 will be in each instant equal to the sum of the two currents IB and IC, Because the first high-side transistor 60 is kept ON during the entire first position phase I1, the current IA through the first coil 52 will increase throughout the first transition phase. The current IA will be substantially constant in the first transition phase I1 because the variations in the currents IB and IC will substantially offset each other.

To determine when the first transition phase I1 is completed and therefore when should enter the second driving phase D2, the motor 50 employs the comparator 78 to measure the current Is through the sense resistor 64. During the portion of the first transition phase I1 in which the second high-side transistor 66 is ON, the current Is through the sense resistor 64 is equal to IC, while during the portion of the first transition phase I1 in which the second low-side transistor 68 is ON, the current Is through the sense resistor 64 is equal to the sum of the currents IB and IC. For this reason, measuring the current Is in the sense resistor 64 when only high side transistor 66 is ON, we can decide with security that the transition phase is terminated when Me voltage Is * Rs (resistance of sense resistor) reaches the voltage reference Vref. In response to determining that the voltage across the sense resistor 64 reaches the voltage reference Vref, the comparator 78 sends a signal to the control logic 74 which causes the control logic to end the first transition phase I1 and begin the second driving phase D2.

During the second driving phase D2, the first coil 52 is again driven in PWM, the second coil 54 is in tristate, and the third coil 56 is coupled to a ground through the sense resistor 64 and the third low-side transistor 72. As a result, the current IA through the first coil 52 equals I, the current IB through the second coil 54 equals zero, and the current IC through the third coil 56 equals –I.

If we effectuate a phase change between the phases A and B (coils 52, 54), at the end of the phase change we should have IA=0 and IB=I. At an instant t2, beginning a second transition phase I2 from the second driving phase D2 to a third driving phase D3, the control logic 74 drives phase A (coil 52) in PWM, drives phase B (coil 54) with a duty cycle equal to 100%, and leaves phase C (coil 56) coupled to ground. Specifically, during the second transition phase I2 the control logic 74 applies the first and second PWM control signals to the first high- and low-side transistors 60, 62, respectively; a constant high control signal to the second high-side transistor 66; a constant low signal to the second low-side transistor 68; a constant low control signal to the third high-side transistor 70 and a constant high control signal to the third low-side transistor 72.

By applying the PWM control signals to the first high- and low-side transistors 60, 62, the current IA through the first coil 52 will tend to increase while the first high-side transistor 60 is turned ON by the first PWM control signal and will tend to decrease when the first low-side transistor 62 is turned ON by the second PWM control signal. The time of total discharge of the first coil 52 will be therefore longer than it would be if the same coil 52 had been immediately put in tristate as in the traditional systems.

The current IB through the second coil 54 will grow with two different time constants according to whether the first high-side transistor 60 or the first low-side transistor 62 is turned ON by their respective PWM control signals during the second transition phase I2. When the first high-side transistor 60 is turned ON, the voltage at the center tap 58 is higher than when the first low-side transistor 62 is turned ON. As a result, the time constant of the current IB through the second coil 54 is lower when the first high-side transistor 60 is turned ON and higher when the first low-side transistor 62 is turned ON. Overall what happens is a slowing of the discharge of the first coil 52 which will be forced to adapt itself to the time constant of the second coil 54.

The end of the second transition period I2 can be triggered by the comparator 74 and effected by the control logic 74 as discussed above with respect to the end of the first transition phase I1. During the portion of the second transition phase I2 in which the first high side transistor 60 is ON, the current Is through the sense resistor 64 equals IC and when the first low-side transistor 62 is ON, the current Is equals IC–IA, which equals IB. In fact, when the first low side transistor 62 is ON, the current through the first coil 52 recirculates through the first low side transistor 62. Therefore the current IA is a current in the direction indicated by Iaric in FIG. 3, and thus is a current that is subtracted from IC to obtain the sense resistor current Is.

In response to determining that the voltage across the sense resistor 64 reaches the voltage reference Vref during the portion of transition phase I2 in which first high-side transistor 60 is ON, the comparator 78 sends a signal to the control logic 74 which causes the control logic to end the second transition phase I2 and begin the third driving phase D3. The control logic 74 continues to alternately drive current through two coils at a time during the driving phases as shown in FIG. 4. Moreover, during each transition phases between successive driving phases, the control logic 74 drives in PWM whichever coil will be kept in tristate during the next driving phase. In doing so, the control logic 74 ensures that the variations of the current in the two phases in commutation during a phase change happen in a way that maintains their sum substantially constant. This greatly reduces the torque ripple that occurs during phase commutations in prior art three-phase motors, and thereby also reduces the acoustic noise accompanying the torque ripple.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method of driving a three-phase motor having first, second, and third coils, comprising:

electrically connecting the first coil to a first voltage reference and the second coil to a second voltage reference while leaving the third coil floating during a first driving phase;

electrically connecting the first coil to the first voltage reference and the third coil to the second voltage reference while leaving the second coil floating during a second driving phase;

electrically connecting the second coil alternately to the first and second voltage references during a first transition phase that immediately follows the first driving phase and immediately precedes the second driving phase;

comparing a voltage across a sense resistor during the first transition phase with a third voltage reference, the sense resistor coupling the coils to the second voltage reference; and adaptively adjusting a duration of the first transition phase based on the comparing step.

2. The method of claim 1, further comprising electrically connecting the first coil to the second voltage reference during the first driving phase such that the first coil is electrically connected alternately to the first and second voltage references during the first driving phase.

3. The method of claim 1, further comprising electrically connecting the second coil to the first voltage reference during the first driving phase such that the second coil is electrically connected alternately to the first and second of voltage references during the first driving phase.

4. The method of claim 1 wherein the first coil is coupled to the first voltage reference by a high-side transistor and to the second voltage reference by a low-side transistor and the act of electrically connecting the first coil to the first voltage reference during the first driving phase includes driving the high-side transistor and the low-side transistor with a pulse width modulated signal such that the first coil is alternately connected to the first and second voltage references respectively by the high-side and low-side transistors during the first driving phase.

5. A method of driving a three-phase motor having first, second, and third coils, comprising:

electrically connecting the first coil to a first voltage reference and the second coil to a second voltage reference while leaving the third coil floating during a first driving phase, wherein the first coil is connected to the first voltage reference by a high-side transistor and to the second voltage reference by a low-side transistor and the act of electrically connecting the first coil to the first voltage reference during the first driving phase includes driving the high-side transistor and the low-side transistor with a pulse width modulated signal such that the first coil is alternately connected to the first and second voltage references respectively by the high-side and low-side transistors during the first driving phase;

electrically connecting the first coil to the first voltage reference and the third coil to the second voltage reference while leaving the second coil floating during a second driving phase;

electrically connecting the second coil alternately to the first and second voltage references during a transition phase that immediately follows the first driving phase and immediately precedes the second driving phase; and driving exclusively the high-side transistor during the transition phase and then re-driving the high-side and low-side transistors with the pulse width modulated signal during the second driving phase.

6. The method of claim 5, further comprising electrically connecting the third coil to the second voltage reference during the transition phase.

7. The method of claim 1 wherein the second coil is coupled to the first voltage reference by a high-side transistor and to the second voltage reference by a low-side transistor and the act of electrically connecting the second coil alternately to the first and second voltage references during the transition phase includes driving the high-side and low-side transistors with a pulse width modulated signal such that the second coil is alternately connected to the first and second voltage references respectively by the high-side and low-side transistors during the first transition phase.

8. The method of claim 1 wherein a second transition phase immediately follows the second driving phase, the method further comprising comparing a voltage across the sense resistor during the second transition phase with the third voltage reference and adaptively adjusting a duration of the second transition phase based on the comparing step during the second transition phase such that the duration of the second transition phase differs from the duration of the first transition phase.

9. A method of driving a three-phase motor with three coils respectively connected to a first voltage reference by three associated high-side transistors and to a second voltage reference by three associated low-side transistors, the method comprising:

activating the transistors according to a predetermined sequence of successive driving phases, wherein during each driving phase the high-side transistor associated with a first one of the three coils is activated, the low-side transistor associated with a second one of the three coils is activated, and neither of the transistors associated with a third one of the three coils is activated such that current flows through the first two coils with the third coil left floating, wherein during each successive driving stage a difference one of the three coils is left floating;

applying a pulse width modulated first control signal to successive ones of the high-side transistors during successive transition phases between successive driving phases, for each transition phase the high-side transistor to which the first control signal is applied is whichever high-side transistor is associated with the coil that will be left floating in the next driving phase; and during each transition phase, applying a constant activation signal to the low-side transistor that will be activated in the next driving stage.

10. The method of claim 9, further comprising applying a pulse width modulated second control signal, opposite to the first control signal, during each transition phase, to the low-side transistor associated with the coil that will be left floating in the next driving phase such that the coil that will be left floating in the next driving phase is alternately coupled to the first and second voltage references during the transition phase.

11. The method of claim 10 wherein the activating step includes, for each driving phase, driving the high-side and low-side transistors associated with the first coil for the driving stage with the second and first control signals, respectively, such that the first coil is electrically connected alternately to the first and second voltage references during the driving phase.

12. The method of claim 11, further comprising, for each transition phase, applying a constant activation signal to the high-side transistor to which the second control signal will be applied in the next driving phase.

13. The method of claim 9, further comprising, for each transition phase, applying a constant activation signal to the high-side transistor that will be activated in the next driving phase.

14. The method of claim 9 wherein each of the coils is coupled to the second voltage reference via a sense resistor, the method further comprising, during each transition phase, comparing a voltage across the sense resistor with a third voltage reference and switching from the transition phase to the next driving phase if the voltage across the sense resistor is greater than the third voltage reference.

15. A three-phase motor driver, comprising:

first and second voltage references;

first, second, and third motor coils coupled to each other;

first and second transistors coupling the first motor coil to the first and second voltage references, respectively;

third and fourth transistors coupling the second motor coil to the first and second voltage references, respectively;

fifth and sixth transistors coupling the third motor coil to the first and second voltage references, respectively;

means for activating the first and fourth transistors and deactivating the fifth and sixth transistors during a first driving phase to electrically connect the first coil to a first voltage reference and the second coil to a second voltage reference while leaving the third coil floating; and for activating the first and sixth transistors and deactivating the third and fourth transistors during a second driving phase to electrically connect the first coil to the first voltage reference and the third coil to the second voltage reference while leaving the second coil floating during a second driving phase; and alternately activating the third and fourth transistors during a transition phase that immediately follows the first driving phase and immediately precedes the second driving phase to electrically connect the second coil alternately to the first and second voltage references;

a sense resistor coupling the second, fourth, and sixth transistors to the second voltage reference; and a comparator having a first input coupled to a third voltage reference, a second input coupled to the sense resistor, and an output, the comparator being structured to compare the third voltage reference with a voltage across the sense resistor as measured at the second input and produce at the output a control signal if the voltage across the sense resistor is greater than the third voltage reference, wherein the means for activating is coupled to the comparator output and, in response to the control signal ends the transition phase and begins the second driving phase.

16. The motor driver of claim 15 wherein the activating means includes means for alternatively activating the first and second transistors during the first driving phase to electrically connect the first coil alternately to the first and second voltage references during the first driving phase.

17. The motor driver of claim 15 wherein the activating means includes means for alternatively activating the third and fourth transistors during the first driving phase such that the second coil is electrically connected alternately to the first and second of voltage references during the first driving phase.

18. The motor driver of claim 15 wherein the activating means includes means for activating the first transistor and deactivating the second transistor during the transition phase such that the first coil is electrically connected to the first voltage reference during the entire transition phase.

19. The motor driver of claim 15 wherein the activating means includes means for activating the sixth transistor and deactivating the fifth transistor during the transition phase such that the third coil is electrically connected to the second voltage reference during the entire transition phase.

* * * * *